United States Patent [19]
Payzant et al.

[11] Patent Number: 6,001,279
[45] Date of Patent: *Dec. 14, 1999

[54] SOLIDIFIED WATER SOLUBLE WOOD PRESERVATIVE AND METHOD OF MAKING THE SAME

[75] Inventors: John Donald Payzant; James Allen Melnichuk, both of Edmonton, Canada

[73] Assignee: Genics Inc., Spruce Grove, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/642,578

[22] Filed: May 3, 1996

[51] Int. Cl.⁶ .......................... C09K 15/02; C09K 15/32; A01N 59/14; A01N 59/20
[52] U.S. Cl. ................ 252/397; 252/400.4; 252/400.53; 424/635; 424/659; 424/660; 428/366
[58] Field of Search ..................................... 252/397, 385, 252/400.4, 400.53; 427/291; 424/630, 635, 660, 658, 659; 428/366, 364

[56] References Cited

U.S. PATENT DOCUMENTS

| | | | |
|---|---|---|---|
| 3,007,844 | 11/1961 | Schultz et al. | 167/38.5 |
| 4,269,875 | 5/1981 | Bechgaard et al. | 427/291 |
| 4,620,990 | 11/1986 | Dicker | 427/291 |
| 4,661,157 | 4/1987 | Beauford et al. | 106/18.13 |
| 4,911,988 | 3/1990 | Cass et al. | 428/537.1 |
| 5,342,438 | 8/1994 | West | 106/18.13 |

*Primary Examiner*—Shean C. Wu
*Attorney, Agent, or Firm*—Davis and Bujold

[57] ABSTRACT

A solidified water soluble wood preservative characterized by a solidified elongate body of a boron compound known as having beneficial effects as a wood preservative, in combination with copper oxide. The method of making the solidified water soluble wood preservative includes the following steps. Firstly, mixing powder-form copper oxide (CuO) and a powder-form boron compound known as having beneficial effects as a wood preservative to form a powder mixture. Secondly, heating the powder mixture at temperatures in excess of 700 degrees celsius until the powder mixture melts to form a homogeneous liquid mixture. Thirdly, forming the homogeneous liquid mixture into a body. Fourthly, annealing the body at temperatures of between 300 and 550 degrees celsius.

8 Claims, 3 Drawing Sheets

SOLIDIFIED WATER SOLUBLE WOOD PRESERVATIVE AND METHOD OF MAKING THE SAME

FIELD OF THE INVENTION

The present invention relates to a solidified water soluble wood preservative and a method of making the same.

BACKGROUND OF THE INVENTION

U.S. Pat. No. 4,269,875 which issued in 1981 describes a novel method for preserving timber pioneered by Carl C. Beckgaard of Denmark. This method involves the insertion of solidified water soluble wood preservative rods into holes drilled in timber. The rods are made from boric oxide. The solidified rods have numerous advantages. They are easier to use in solidified form, gloves are not required. The wood preservative, being water soluble, is released over time by moisture in the wood. The strength of the wood preservative on a weight basis is increased, as the moisture in the wood combines with the boric oxide and produces boric acid in a ratio of 1:1.45.

The formation of boric oxide into water soluble rods is a three step process. The first step involves melting the boric oxide. The second step involves moulding the boric oxide into the desired shape. The third step involves annealing the rods to make them suitable for the intended use.

In U.S. Pat. No. 4,269,875 Carl C. Bechgaard observes that some fungi are controlled more effectively by copper oxide or one of the other metal oxides, in combination with boric oxide. He contemplated making the rods from a combination of boric oxide and copper oxide. In the fifteen years since the issue of the patent neither Mr. Bechgaard, nor any of his licensees have been successful in fabricating a rod that contains a combination of boric oxide and copper oxide.

The addition of copper oxide changes the physical properties of boric oxide, creating numerous problems. Some of the problems are relatively minor, such as the mixture sticking to the mould. Other problems are of critical importance, such as bubbling, crystallization or a failure of the mixture to anneal. The result has been failed attempts that are totally unsuitable for use. These failed rods tend to crumble into dust.

Boric oxide and copper have been combined in other forms. For example, wood preservative pastes exist that contain both boric oxide and copper. These wood preservatives utilize solvents. This methodology is not transferable to the manufacture of wood preservative rods. The use of solvents is precluded due to the low flash point of such solvents.

SUMMARY OF THE INVENTION

What is required is a solidified water soluble wood preservative that contains both boron and copper, and a method of making the same.

According to one aspect of the present invention there is provided a solidified water soluble wood preservative. This wood preservative is characterized by a solidified elongate body of a boron compound known as having beneficial effects as a wood preservative, in combination with copper oxide.

The beneficial effects of boron and copper, in combination, are known. Prior to the present invention, they had not been successfully combined in a solidified water soluble wood preservative.

According to another aspect of the present invention there is provided a method of making a solidified water soluble wood preservative. Firstly, mixing powder-form copper oxide (CuO) and a powder-form boron compound known as having beneficial effects as a wood preservative to form a powder mixture. Secondly, heating the powder mixture at temperatures in excess of 700 degrees celsius until the powder mixture melts to form a homogeneous liquid mixture. Thirdly, forming the homogeneous liquid mixture into a body. Fourthly, annealing the body at temperatures of between 300 and 550 degrees celsius.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

The preferred method of making a solidified water soluble wood preservative will now be described.

Figure 1:
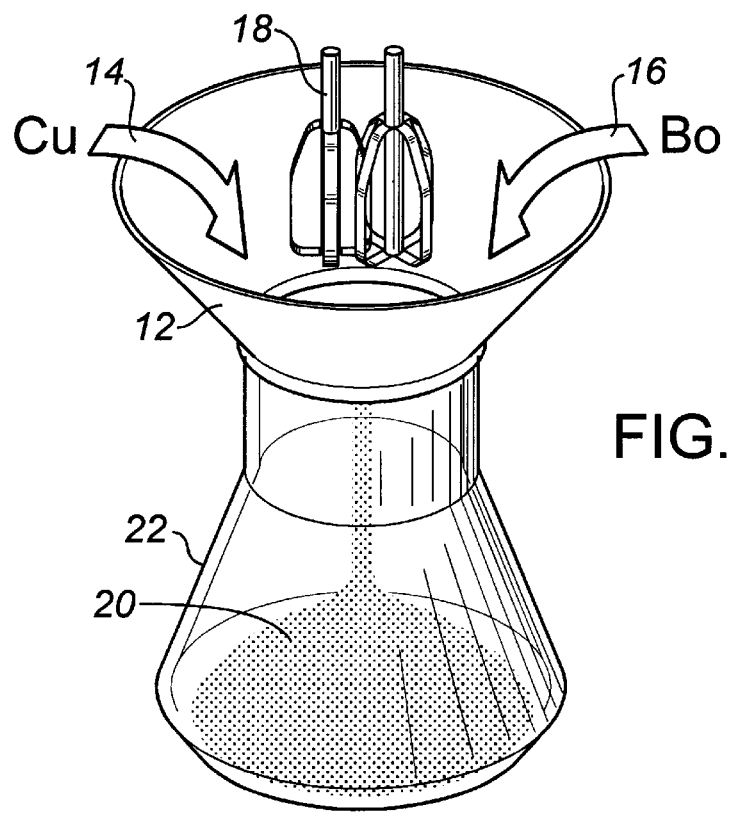
FIG. 1 is a perspective view of a step of mixing of powders to form a powder mixture according to the teachings of the present method.

Firstly, mixing powder-form copper oxide (CuO) and powder-form disodium octaborate tetrahydrate ($Na_2B_8O_{13} \cdot 4H_2O$) to form a powder mixture. The manner of mixing is illustrated in FIG. 1. The mixing takes place in a funnel-like mixing hopper 12. The addition of powder-form copper oxide is represented by arrow 14. The addition of a powder-form boron compound with known properties as a wood preservative is represented by arrow 16. Mixing of the powders is accomplished through the use of rotary mixing paddles 18. The mixing of the powders results in a powder mixture 20 that flows out of funnel-like mixing hopper 12 into a receptacle 22. The preferred boron compound is disodium octaborate tetrahydrate ($Na_2B_8O_{13} \cdot 4H_2O$). The Applicant has obtained beneficial results using disodium octaborate tetrahydrate sold by U.S. Borax Inc. under the trademark TIM-BOR. Formulations of powder mixture 20 will hereinafter be further described.

Figure 2:
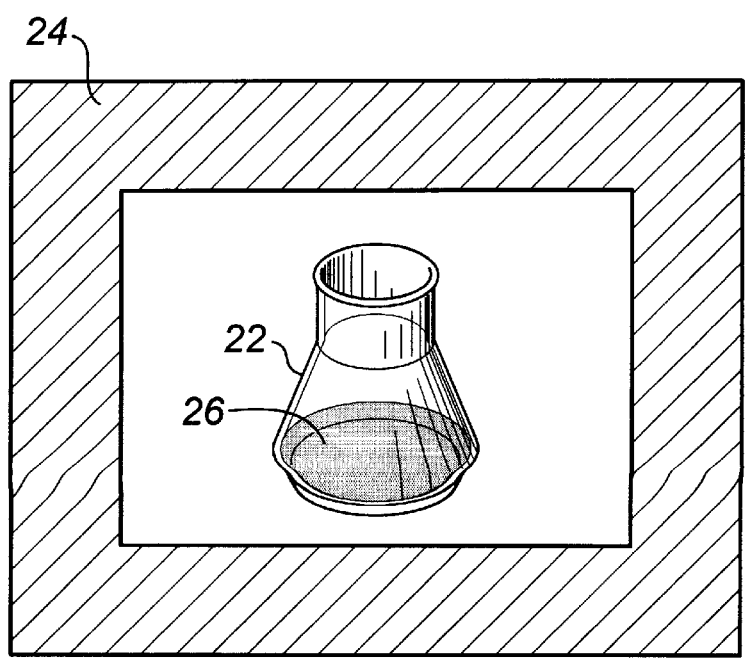
FIG. 2 is a side elevation view of a step of melting the powder mixture to form a homogeneous liquid mixture according to the teachings of the present method.

Secondly, heating powder mixture 20 at temperatures in excess of 900 degrees celsius until powder mixture 20 melts forming a homogeneous liquid mixture. Referring to FIG. 2, receptacle 22 is inserted into a kiln 24 and heat is applied until power mixture 20 melts to become homogeneous liquid mixture 26. Temperatures as low as 700 degrees celsius have utility in allowing the materials to be formed, but the mixture remains so viscous as to preclude forming through the use of a mould. Temperatures in excess of 900 degrees celsius are preferred as, at such temperatures, the homogeneous mixture becomes quite liquid and, as such, can be poured.

Figure 3:
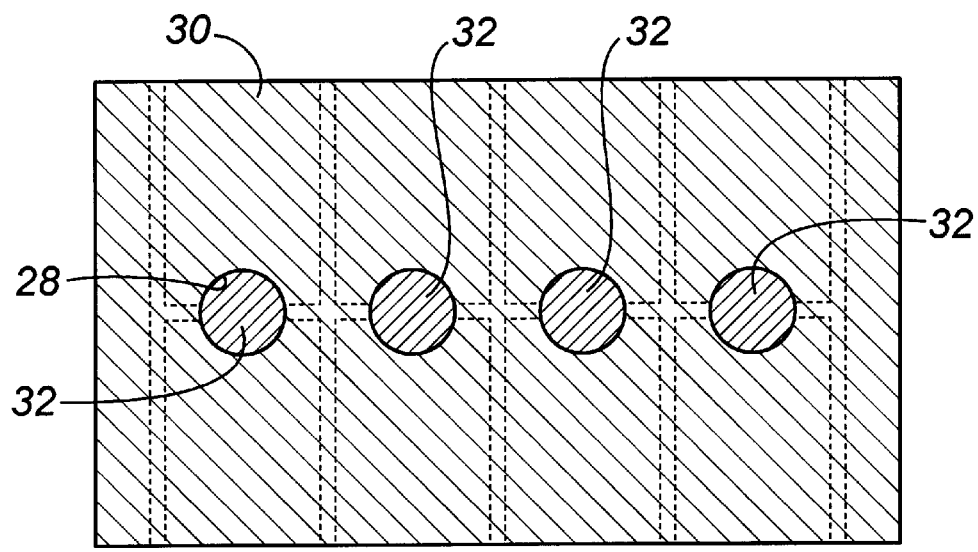
FIG. 3 is a top plan view, in section, of a mould used for a step of moulding the homogeneous liquid mixture to form a body according to the teachings of the present invention.
Figure 4:
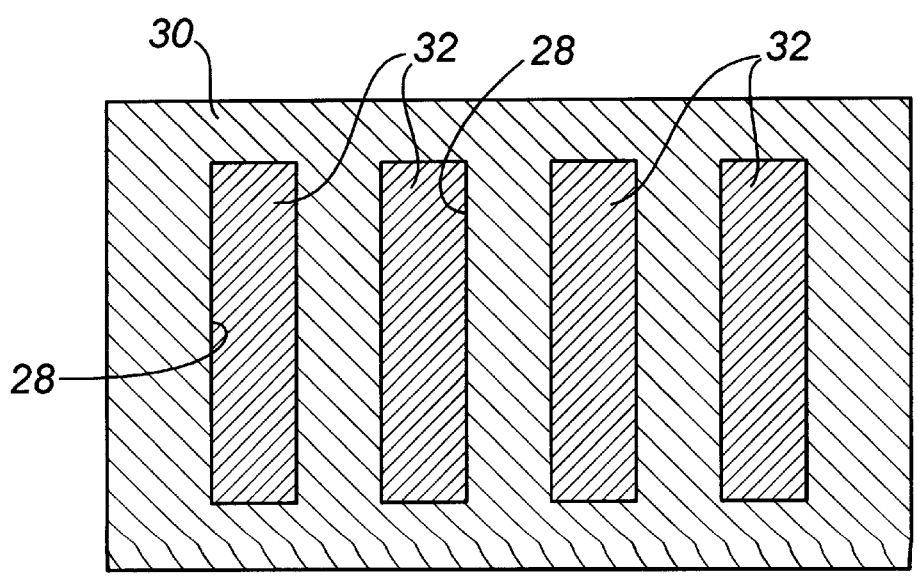
FIG. 4 is a side elevation view, in section, of the mould illustrated in FIG. 3 used for a step of moulding the homogeneous liquid mixture according to the teachings of the present invention.

Thirdly, pouring homogeneous liquid mixture 26 into one of a plurality of cavities 28 in a preheated mould 30, as illustrated in FIGS. 3 and 4. This enables homogeneous liquid mixture 26 to be formed into a body 32. In FIGS. 3 and 4, body 32 is illustrated as being in the form of a cylindrical rod. There are numerous other forms that body 32 can take and still have utility; bearing in mind that body, 32 must ultimately be inserted into a hole drilled into wood. One viable alternative to an elongate rod is a granular mass. This depending upon the size selected, this granular mass could be described as a bead or a pellet. Referring to FIG. 3, mould 30 is a steel split mould. It will be apparent to one skilled in the art that other moulding techniques could be used. Mould 30 must be preheated. Beneficial results have been obtained in a temperature range of between 350 and 500 degrees celsius. The mould must be preheated within a broad range of between 300 and 700 degrees celsius. If the mould temperature is below about 300 degrees celsius when hot liquid is cast into it, the resulting cast body tends to shatter either in the mould or on attempts to remove it. Above 700 degrees celsius, the body reacts with the mould and sticks to mould 30. The range of 350 to 500 degrees celsius is preferred in order to avoid the problems experienced at either extreme.

Figure 5:
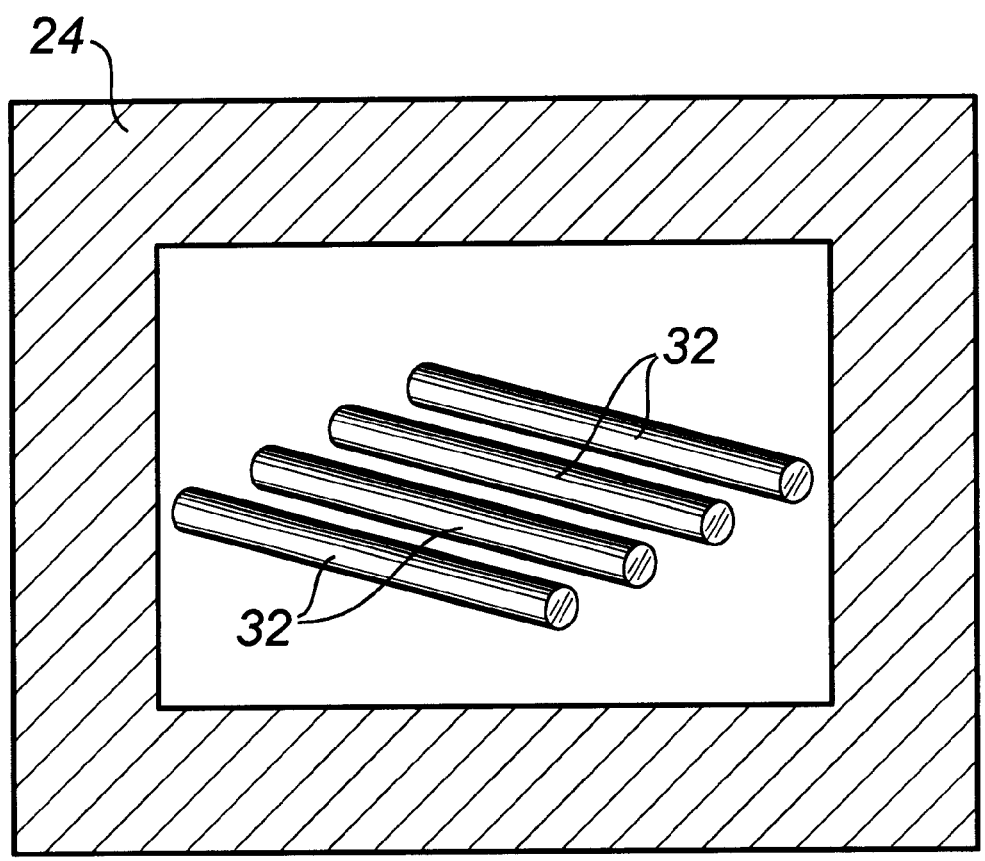
FIG. 5 is a side elevation view of a step of annealing the body according to the teachings of the present method.

Fourthly, removing the body from the mould and annealing each body 32 at temperatures of between 300 and 550 degrees celsius. Referring to FIG. 5, the annealing process also takes place in kiln 24. The annealing process is a combination of temperature and time. The higher the temperature the less time that is required. Conversely, the lower the temperature, the more time that is required. When the temperature is less than 300 degrees celsius the temperature is insufficient to anneal the rods. Conversely, when the temperature exceeds 550 degrees celsius the material is not stressed and does not anneal.

The following are formulations of powder mixture 20 that have been successfully used for the formation of the above described wood preservative rods. It is more difficult to provide exact percentages on the final product as water is lost from the disodium octaborate tetrahydrate during the heating process. Although the examples will provide specific formulations, it will be appreciated that the amount of copper or boron in powder mixture 20 is totally dependent upon the intended application. Now that a method has been developed for combining the copper and boron, it is theoretically possible to combine them in any number of permutations and combinations. This includes a primarily copper based formulation containing 99.5% copper or, conversely, a primarily boron based formulation containing 99.5% boron. It also includes mixtures in which the copper and boron content is roughly equal. It is undesirable for the copper content to drop below at least 0.5% of the powder mixture, as the desired synergistic beneficial effects are lost. Although any combination is theoretically possible, in a commercial formulation it is preferred that the boron content be maintained at least at 50% and the copper content not exceed 50%. For as the copper content exceeds 50%, and the boron content proportionately decreased, the effectiveness of the boron content is diminished.

Formulation #1
  copper oxide (CuO) 2.5%
  disodium octaborate tetrahydrate ($Na_2B_8O_{13}.4H_2O$) 97.5%
Formulation #2
  copper oxide (CuO) 2.4%
  disodium octaborate tetrahydrate ($Na_2B_8O_{13}.4H_2O$) 92.8%
  boric acid ($H_3BO_3$) 4.8%
Formulation #3
  copper oxide (CuO) 5.0%
  disodium octaborate tetrahydrate ($Na_2B_8O_{13}.4H_2O$) 95%
Formulation #4
  copper oxide (CuO) 4.8%
  disodium octaborate tetrahydrate ($Na_2B_8O_{13}.4H_2O$) 90.4%
  boric acid ($H_3BO_3$) 4.8%
Formulation #5
  copper oxide (CuO) 10%
  disodium octaborate tetrahydrate ($Na_2B_8O_{13}.4H_2O$) 90.0%
Formulation #6
  copper oxide (CuO) 9.5%
  disodium octaborate tetrahydrate ($Na_2B_8O_{13}.4H_2$)) 85.7%
  boric acid ($H_3BO_3$) 4.8%

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A method of making a solidified water soluble wood preservative, comprising the steps of:

firstly, mixing powder-form copper oxide (Cuo) and a powder-form boron compound known as having beneficial effects as a wood preservative to form a powder mixture, the copper oxide content being not less than 0.5% and not tore than 50%;

secondly, heating the powder mixture until the powder mixture melts to form a homogeneous liquid mixture;

thirdly, forming the homogeneous liquid mixture into a body; and fourthly, annealing the body at temperatures of between 300 and 550 degrees celsius to form a homogeneous solid.

2. The method as defined in claim 1, having disodium octaborate tetrahydrate ($Na_2B_8O_{13}.4H_2O$) as the boron compound in the powder mixture.

3. The method as defined in claim 1, having boric acid added to the powder mixture.

4. A method of making a solidified water soluble wood preservative, comprising the steps of:

firstly, mixing powder-form copper oxide (CuO) and powder-form disodium octaborate tetrahydrate ($Na_2B_8O_{13}.4H_2O$) to form a powder mixture, the powder-form copper oxide representing at least 2.4% and not more than 50% of the powder mixture;

secondly, heating the powder mixture until the powder mixture melts forming a homogeneous liquid mixture, such temperatures being in excess of 900 degrees celsius so as to sufficiently reduce the viscosity of the mixture that the mixture can be poured;

thirdly, pouring the homogeneous liquid mixture into a preheated mould whereby the homogeneous mixture is moulded to formed into a body; and fourthly, removing the body from the mould and annealing the rods at temperatures of between 300 and 550 degrees celsius to form a homogeneous solid.

5. The method as defined in claim 4, the mould being preheated to temperatures of between 300 and 700 degrees celsius.

6. The method as defined in claim 4, having boric acid added to the powder mixture.

7. The method as defined in claim 4, the mould forming the body into an elongate rod.

8. The method as defined in claim 4, the mould forming the body into a granular mass resembling a pellet.

* * * * *